United States Patent
Takeuchi et al.

(10) Patent No.: US 7,010,659 B2
(45) Date of Patent: Mar. 7, 2006

(54) METHOD FOR SETTING UP DISK-ARRAY DEVICE, COMPUTER-READABLE STORAGE MEDIUM, AND INFORMATION PROCESSING DEVICE

(75) Inventors: Shinya Takeuchi, Yokohama (JP); Yasufumi Uchiyama, Ebina (JP); Shotaro Ohno, Yamato (JP); Daisuke Shinohara, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 10/327,785

(22) Filed: Dec. 23, 2002

(65) Prior Publication Data

US 2004/0030855 A1 Feb. 12, 2004

(30) Foreign Application Priority Data

Aug. 9, 2002 (JP) .............................. 2002-233262

(51) Int. Cl.
*G06F 12/00* (2006.01)
(52) U.S. Cl. ..................... 711/170; 711/114; 711/171; 711/172
(58) Field of Classification Search ................ None
See application file for complete search history.

(56) References Cited

U.S. PATENT DOCUMENTS

| | | | |
|---|---|---|---|
| 5,627,955 A | | 5/1997 | Gnirss |
| 5,822,782 A | * | 10/1998 | Humlicek et al. .......... 711/170 |
| 6,058,455 A | * | 5/2000 | Islam et al. ................ 711/114 |
| 2003/0070053 A1 | * | 4/2003 | Gallo et al. ................ 711/170 |

* cited by examiner

*Primary Examiner*—Mano Padmanabhan
*Assistant Examiner*—Craig Evan Walter
(74) *Attorney, Agent, or Firm*—Townsend and Townsend and Crew LLP (57) ABSTRACT

A method for setting up a disk-array device, which includes at least one connection port for connection with at least one computer and at least one storage volume for storing data, comprises the steps of: loading configuration-defining data to an information processing device that is connected to the disk-array device, the configuration-defining data being in an electronic-data form; the information processing device generating, in accordance with the configuration-defining data, a setup command for setup of the disk-array device and transmitting the setup command to the disk-array device; and the disk-array device receiving the setup command and performing the setup according to the setup command.

18 Claims, 11 Drawing Sheets

(1) PATH CONFIGURATION-DEFINING TABLE

| VOLUME | FC PORT |
|---|---|
| 3 | B |
| 6 | D |

SHOWS CORRESPONDENCE WITH FC PORT FOR EACH VOLUME

601

(2) SECURITY CONFIGURATION-DEFINING TABLE

| FC PORT | WWN |
|---|---|
| B | 0x0000000000005004 |
| D | 0x0000000000007002 |

SHOWS CORRESPONDENCE WITH WWN FOR EACH FC PORT

VALUE STARTING WITH 0x INDICATES HEXADECIMAL VALUE

(1) PATH CONFIGURATION-DEFINING TABLE

| VOLUME | FC PORT |
|---|---|
| 3 | CL1-B |
| 6 | CL1-D |

SHOWS CORRESPONDENCE WITH FC PORT FOR EACH VOLUME

603

(2) SECURITY CONFIGURATION-DEFINING TABLE

| FC PORT | WWN |
|---|---|
| CL1-B | 00.00.00.00.00.00.50.04 |
| CL1-D | 00.00.00.00.00.00.70.02 |

SHOWS CORRESPONDENCE WITH WWN FOR EACH FC PORT

| VOLUME | FC PORT |
|---|---|
| 1 | |
| 2 | CL1-A |
| 3 | CL1-B |
| 4 | |

(1) VOLUME-TO-FC PORT
CONFIGURATION LIST

SHOWS CORRESPONDENCE
WITH FC PORT
FOR EACH VOLUME

BLANK IS SHOWN
WHERE NO PATH EXISTS

701

| FC PORT | WWN |
|---|---|
| CL1-A | 00.00.00.00.00.00.50.02 |
| CL1-B | 00.00.00.00.00.00.50.04 |
| CL1-C | |
| CL1-D | |

(2) FC PORT-TO-WWN
CONFIGURATION LIST

SHOWS CORRESPONDENCE
WITH WWN
FOR EACH FC PORT

BLANK IS SHOWN
WHERE NO SECURITY EXISTS

| | | |
|---|---|---|
| NORMAL | <br>WWN=00.00.00.00.00.00.44.01    301    102 CL1-A    101 VOLUME 1 | CONNECT EACH ICON WITH LINE |
| DUPLICATE DEFINITION | 301 —×— 102 CL1-A —×— 101 VOLUME 1<br>WWN=00.00.00.00.00.00.44.01 | MARK X ON LINE CONNECTING EACH ICON |
| ERROR DATA | (1) 301 — 102 ? CL1-A    101 VOLUME 1<br>WWN=00.00.00.00.00.00.44.01 | (1) MARK ? NEXT TO FC-PORT ICON WHEN VOLUME NOT EXISTING IN CONFIG. LIST IS DESIGNATED |
| | (2) 301 ?    102 CL1-A ?    101 VOLUME 1<br>WWN=00.00.00.00.00.00.44.01 | (2) WHEN FC PORT NOT EXISTING IN CONFIG. LIST IS DESIGNATED IN BOTH PATH AND SECURITY CONFIG DEFINING TABLES |
| | (3) 301 ?    102 CL1-A — 101 VOLUME 1<br>WWN=00.00.00.00.00.00.44.01 | (3) WHEN FC PORT NOT EXISTING IN CONFIG. LIST IS DESIGNATED IN SECURITY CONFIGURATION-DEFINING TABLE |
| | (4) 301 — 102 CL1-A ? 101 VOLUME 1<br>WWN=00.00.00.00.00.00.44.01 | (4) WHEN FC PORT NOT EXISTING IN CONFIG. LIST IS DESIGNATED IN PATH CONFIGURATION-DEFINING TABLE |

METHOD FOR SETTING UP DISK-ARRAY DEVICE, COMPUTER-READABLE STORAGE MEDIUM, AND INFORMATION PROCESSING DEVICE

CROSS-REFERENCE TO RELATED APPLICATIONS

The present application claims priority upon Japanese Patent Application No. 2002-233262 filed on Aug. 9, 2002, which is herein incorporated by reference.

BACKGROUND OF THE INVENTION

1. Field of the Invention

The present invention relates to a method for setting up a disk-array device, a computer-readable storage medium, and an information processing device.

2. Description of the Related Art

One example of a way of setting a definition of system configuration is disclosed in U.S. Pat. No. 5,627,955. According to this disclosure, a configuration-defining chart that defines the logical connection between a device and a processor is provided in the processor, and this logical connection relationship is displayed.

Recently, the amount of information handled by computer systems has been increasing, and accordingly, the scale of disk-array devices for storing data is becoming larger. As a result, the amount of setup work required for using a disk-array device in a computer system has been increasing.

However, some disk-array devices are constructed as large-scale disk-array devices in which as many as thousands of logical volumes may be configured. For such disk-array devices, there is a demand for an environment in which the configuration can be defined more easily.

More specifically, a large-scale disk-array device may require larger maintenance load that is entailed with disk-array device setup, thereby the system's management cost being raised. This holds true not only for the initial setup of a disk-array device but also for the setup changes of a running disk-array device.

SUMMARY OF THE INVENTION

Under the aforementioned circumstances, an object of the present invention is to reduce the labor required for disk-array device setup.

According to one aspect of the present invention, a method for setting up a disk-array device, which includes at least one connection port for connection with at least one computer and at least one storage volume for storing data, comprises the steps of: loading configuration-defining data to an information processing device that is connected to the disk-array device, the configuration-defining data being in an electronic-data form; the information processing device generating, in accordance with the configuration-defining data, a setup command for setup of the disk-array device and transmitting the setup command to the disk-array device; and the disk-array device receiving the setup command and performing the setup according to the setup command.

The foregoing and other features and advantages of the present invention will become apparent from the following description of the embodiments of the invention and from the accompanying drawings.

BRIEF DESCRIPTION OF THE DRAWINGS

For a more complete understanding of the present invention and the advantages thereof, reference is now made to the following description taken in conjunction with the accompanying drawings wherein.

DETAILED DESCRIPTION OF THE INVENTION

At least the following matters will be made clear by the explanation in the present specification and the description of the accompanying drawings.

In a first aspect of the present invention, a method for setting up a disk-array device, which includes at least one connection port for connection with at least one computer and at least one storage volume for storing data, comprises the steps of: loading configuration-defining data to an information processing device that is connected to the disk-array device, the configuration-defining data being in an electronic-data form; the information processing device generating, in accordance with the configuration-defining data, a setup command for setup of the disk-array device and transmitting the setup command to the disk-array device; and the disk-array device receiving the setup command and performing the setup according to the setup command. Accordingly, it becomes possible to easily modify and reuse the disk-array device's settings. Therefore, the burden relating to setup can be reduced.

In another aspect of the present invention, the configuration-defining data contains at least one configuration-defining parameter of the disk-array device in a prescribed format, and the method further comprises the step of: before the step of generating the setup command and transmitting the setup command to the disk-array device, the information processing device verifying whether the configuration-defining parameter is applicable to the configuration of the disk-array device and displaying the configuration-defining parameter that has been determined to be inapplicable to the configuration. Since it becomes possible to find errors in settings with a management program before a setup command is sent to the disk-array device, the efficiency of setup work can be increased.

In another aspect of the present invention, the displaying of the configuration-defining parameter is done graphically. Since a maintenance engineer can easily locate errors and identify their causes, the burden relating to setup can be reduced.

In still another aspect of the present invention, the configuration-defining data contains at least one configuration-defining parameter of the disk-array device in a prescribed format, and the method further comprises the step of: before the step of generating the setup command and transmitting the setup command to the disk-array device, the information processing device verifying whether the configuration-defining parameter is applicable to the configuration of the disk-array device and displaying at least one candidate which is applicable to the configuration for the configuration-defining parameter that has been determined to be inapplicable to the configuration. Since a candidate for correcting an error in a configuration-defining table will be displayed, errors can be corrected with ease.

Although the use of software for implementing the present invention has been described, the present invention can also be implemented by equivalent hardware.

A detailed description will be given below with reference to the drawings.

Figure 1:
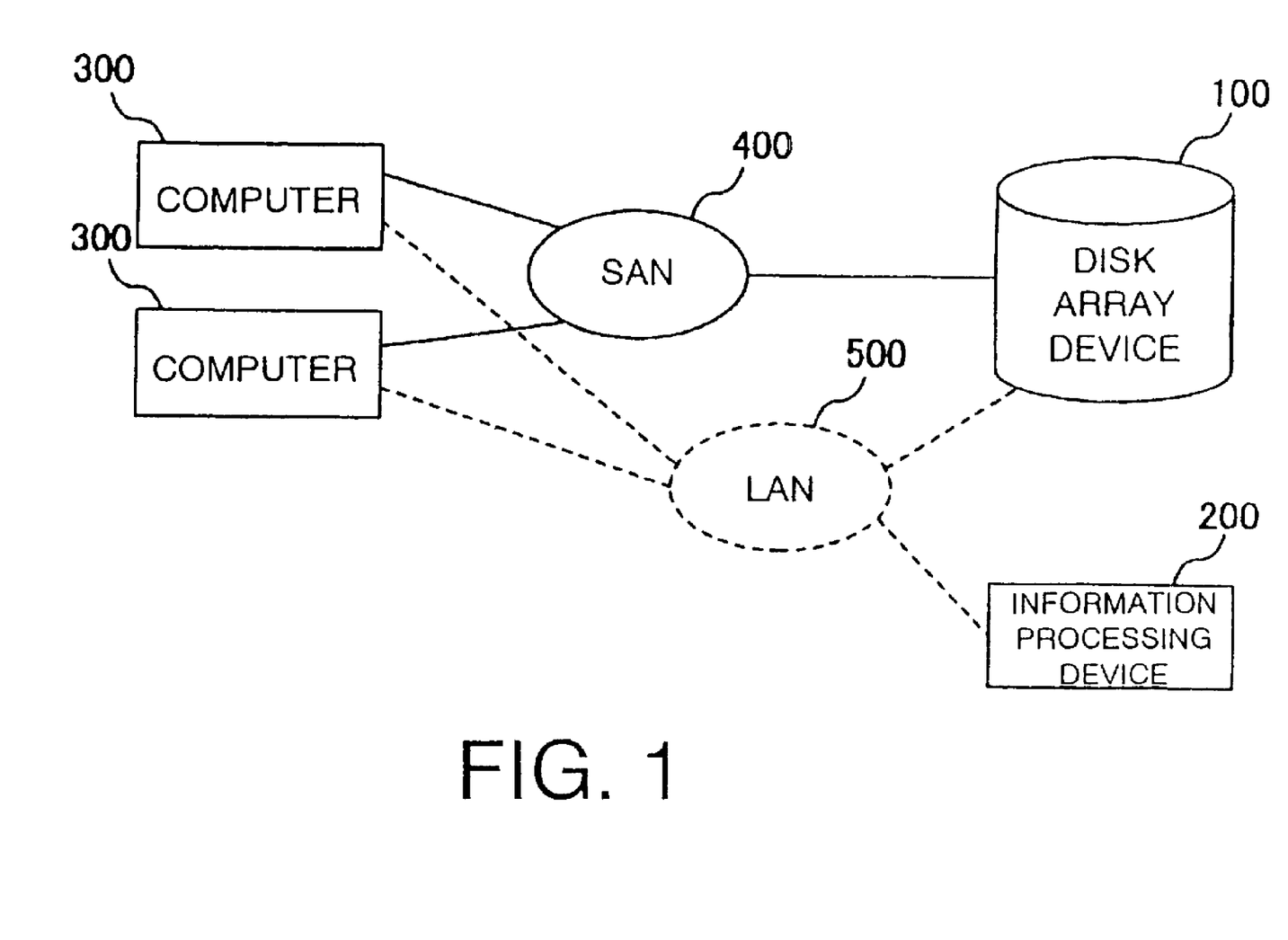
FIG. 1 is a block diagram that shows the overall configuration of a computer system according to an embodiment of the present invention.

FIG. 1 is a block diagram that shows the overall configuration of a computer system according to an embodiment of the present invention.

Two computers 300, an information processing device 200, and a disk-array device 100 are connected to a LAN (Local Area Network) 500. The two computers 300 can exchange information with each other via the LAN 500. The information processing device 200 communicates with the disk-array device 100 via the LAN 500 to set the disk-array device 100.

The Internet may be used instead of the LAN 500, or only two computers may be connected directly. The information processing device 200 and the disk-array device 100 may be connected directly with a dedicated cable or the like instead of being connected via the LAN 500.

The two computers 300 acquire the data stored in the disk-array device 100 via a SAN (Storage Area Network) 400. The SAN 400 is configured based on Fibre Channel (FC). Any number of computers 300 may be used instead of a set of two computers. Further, two or more disk-array devices may be used instead of only one.

Figure 13:
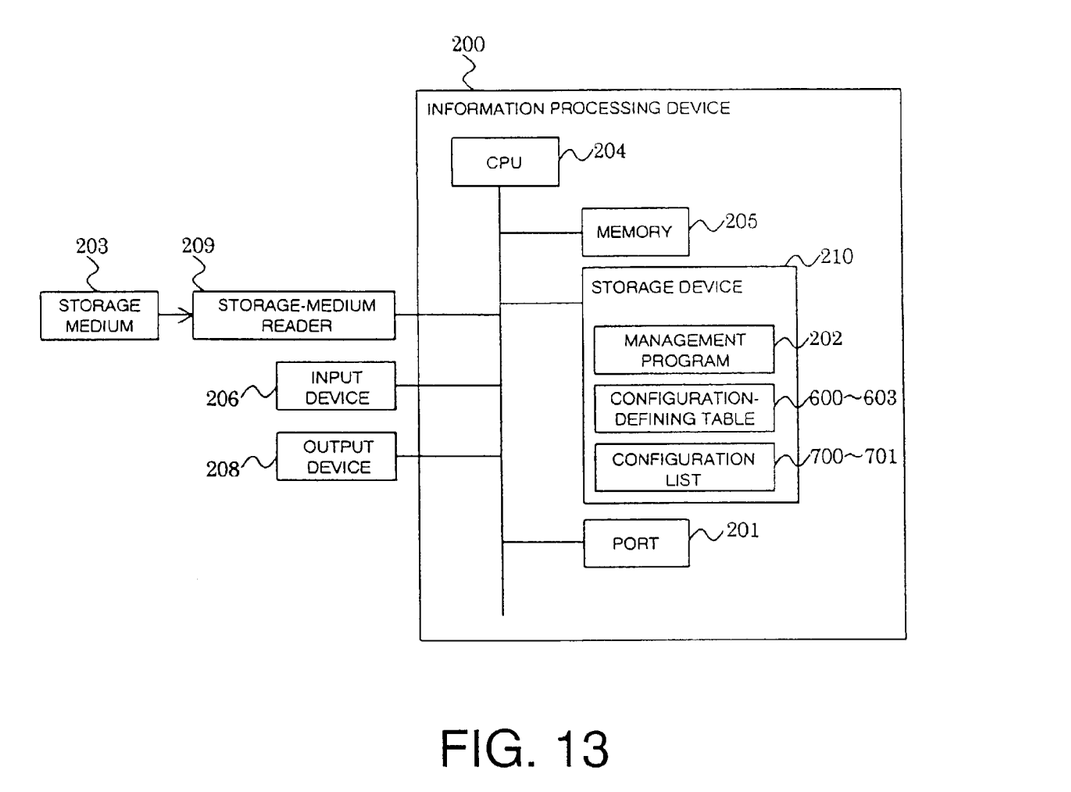
FIG. 13 shows a block diagram of the information processing device according to an embodiment of the present invention.

FIG. 13 is a block diagram that shows the configuration of the information processing device 200. The information processing device 200 comprises a CPU (Central Processing Unit) 204, a memory 205, a storage device 210, a storage-medium reader 209, an input device 206, an output device 208, and a port 201.

The CPU 204 takes charge of the overall control of the information processing device 200 and realizes various functions according to the present example by executing various programs stored in the memory 205. The storage device 210 can store various programs and data. For example, hard disk devices and the like may be used as the storage device 210. In the present example, the storage device 210 stores a management program 202, configuration-defining tables 600, 601, 602, 603, and configuration lists 700, 701, details of which being explained in detail later on. Note that the storage device 210 may be build into the information processing device 200, or it may be added externally. The storage-medium reader 209 is a device for reading various programs and/or data recorded on a storage medium 203. The various programs and/or data that have been read are stored in the storage device 210. Flexible disks, CD-ROMs, semiconductor memories or the like can be used as the storage medium 203. The storage-medium reader 209 may be build into the information processing device 200, or it may be added externally. The input device 206 is used by an operator for inputting data to the information processing device 200. For example, a keyboard, a mouse or the like may be used as the input device 206. The output device 208 is used as a display device for displaying various information. For example, a display, a printer or the like may be used as the output device 208. The port 201 is used for communication with external devices via the LAN 500.

Figure 2:
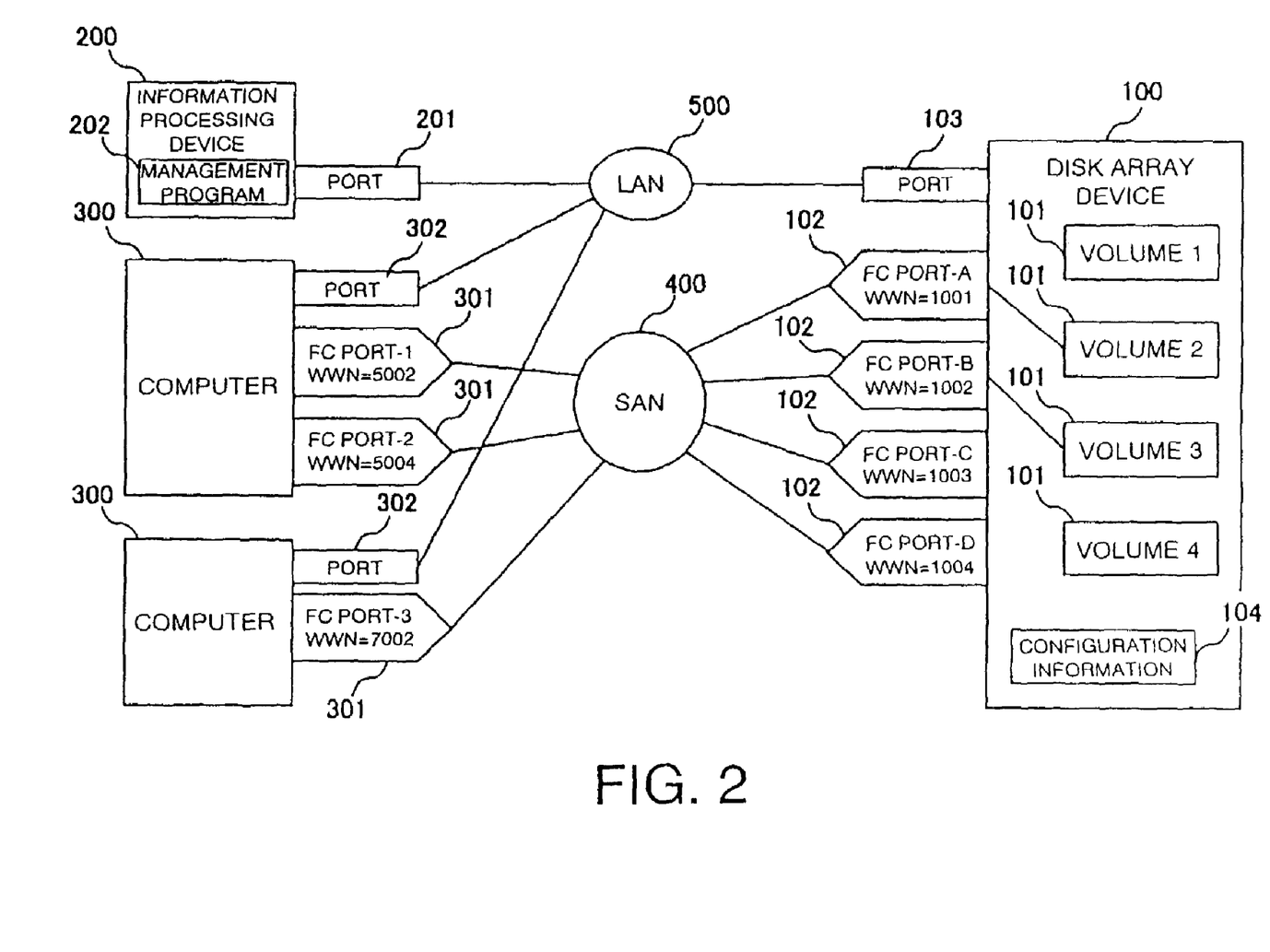
FIG. 2 is a block diagram that shows path/security setup for a computer system according to an embodiment of the present invention.

FIG. 2 is a block diagram that shows path/security setup for a computer system according to the present embodiment.

The disk-array device 100 and the computers 300 have FC ports (connection ports) 102, 301 for connecting to the SAN 400. They also have ports 103, 302 for connecting to the LAN 500. The information processing device 200 is connected to the LAN 500 via port 201 to set up the disk-array device 100. To perform this setup process, the information processing device 200 executes the management program 202.

The management program 202 is recorded on a storage medium 203 and read into and executed by the information processing device 200. Reading-in of the management program 202 by the information processing device 200 is performed with the storage-medium reader 209. Further, if the management program 202 is recorded on a storage medium 203 provided in another equipment (not shown) that is connected via the LAN 500, it would also be possible to read-in the management program 202 from the other equipment by communicating with that equipment via the port 201.

Each of the FC ports 102, 301 is assigned a WWN (World Wide Name). The WWN is a unique identification number given to each FC port, used for FC port identification. Although the WWN is a 16-digit hexadecimal number, only the four lowest digits are indicated in FIG. 2.

"Path setup" or "setting paths" means to establish the relationship between the FC ports 102, which are provided for connecting the disk-array device 100 to the SAN 400, and storage volumes (hereinafter referred to as the "volumes") 100, which are provided within the disk-array device 100. This path setup ensures that the input/output data from a computer 300 connected to an FC port 102 can be stored on the associated volume 101.

"Security setup" or "setting security" means to establish the relationship between the FC ports 102 on the disk-array device 100 and the FC ports 301 on the computers 300. This security setup prevents computers from inadvertently accessing the same FC port 102 in situations where they cannot share the volumes 101.

In the present embodiment, the paths of the disk-array device 100 are defined so that volume 2 is correlated with FC port A (four lowest WWN digits=1001) and that volume 3 is correlated with FC port B (four lowest WWN digits=1002). Although the security setup is explained in detail later, it is defined so that FC port A is correlated with FC port 1 (four lowest WWN digits=5002) and that FC port B is correlated with FC port 2 (four lowest WWN digits=5004).

If, for instance, a computer 300 outputs data from FC port 1 in situations where the above relationships are established, the data can be stored on volume 2 via FC port A on the disk-array device 100.

The path and security settings are stored in the disk-array device 100 as configuration information 104. The path and security settings can be changed by updating the configuration information 104.

Figure 3:
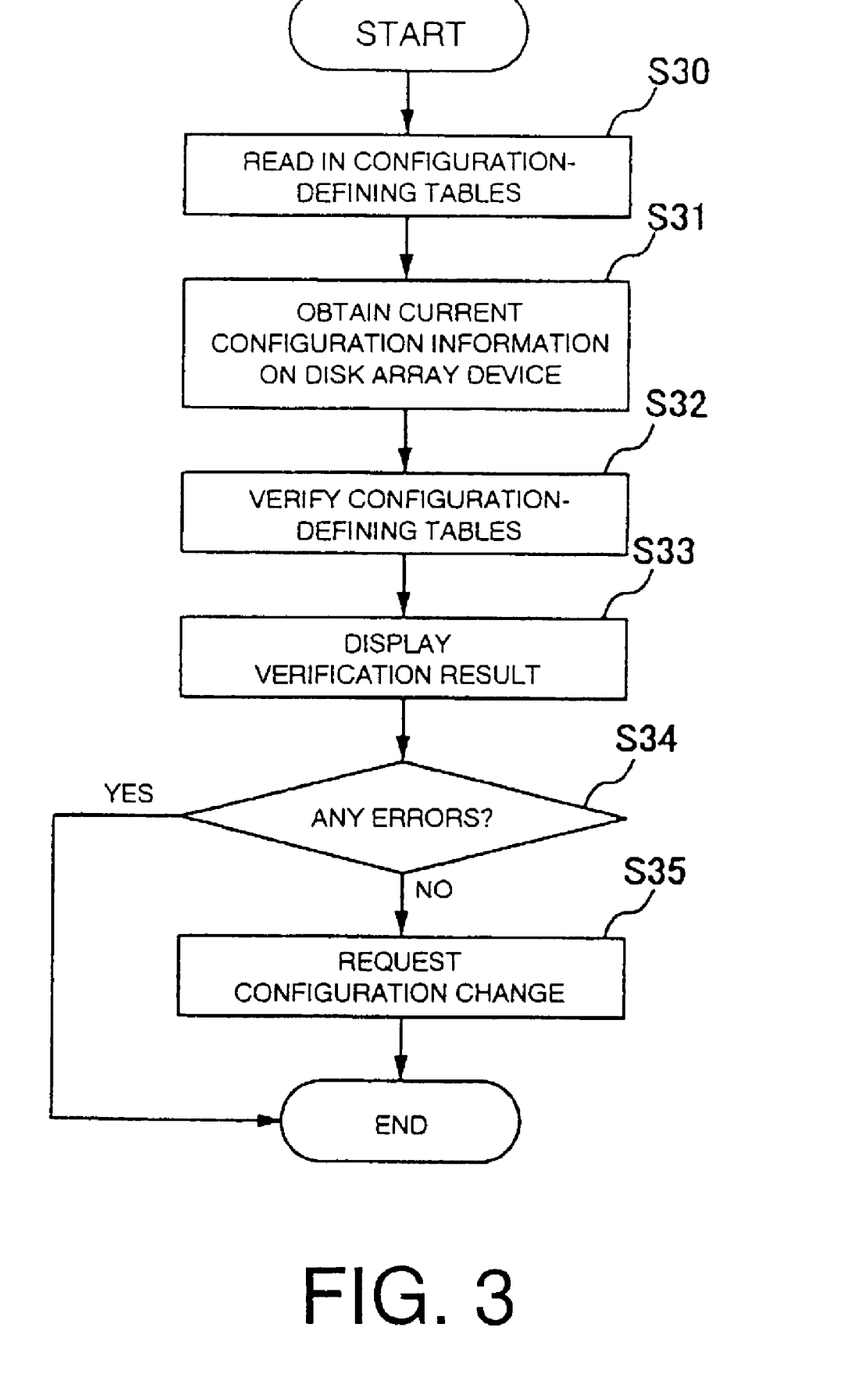
FIG. 3 is a flowchart of a process in setting up a disk-array device according to an embodiment of the present invention.

FIG. 3 is a flowchart of a process for setting up a disk-array device according to the present embodiment.

As described earlier, the disk-array device 100 is set by executing the management program 202 on the information processing device 200. Therefore, the flowchart in FIG. 3 indicates the process flow during the execution of the management program 202.

First, the management program 202, which is running on the information processing device 200, is made to load configuration-defining tables (configuration-defining data) (S30).

The configuration-defining tables are recorded on a storage medium 203 and read, or loaded, into the information processing device 200. Reading-in of the configuration-defining tables by the information processing device 200 is performed with the storage-medium reader 209 (which may function as "means for loading configuration-defining data"). Further, if the configuration-defining tables are recorded on a storage medium 203 provided in another equipment (not shown) that is connected via the LAN 500, it would also be possible to read-in, or load, the configuration-defining tables from the other equipment by communicating with that equipment via the port 201 (which would in this case function as "means for loading configuration-defining data").

Figure 4:
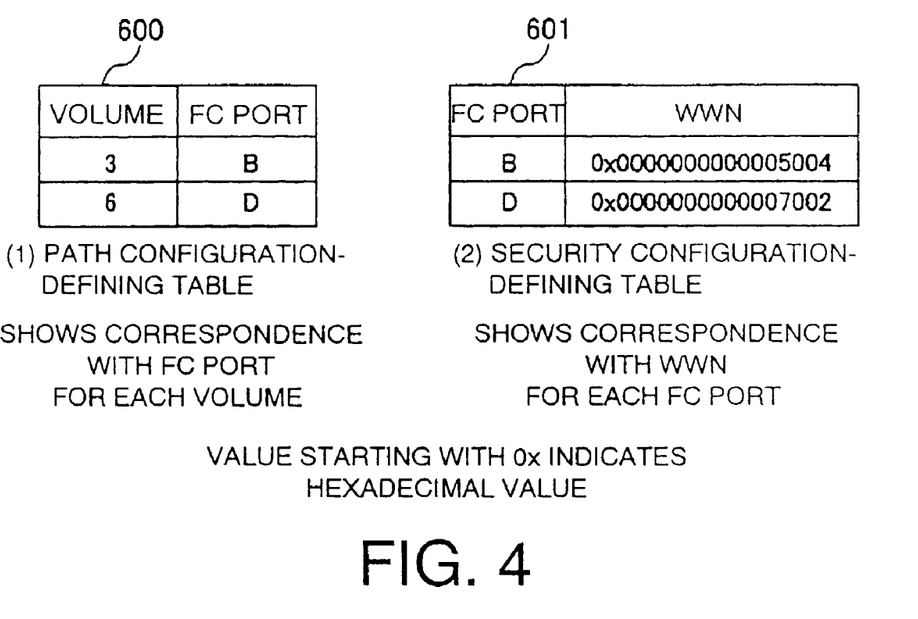
FIG. 4 shows configuration-defining tables that define the path and security configurations for disk-array device setup according to an embodiment of the present invention.

A configuration-defining table consists of electronic data in which the settings to be applied to the disk-array device 100 is written in a prescribed format. FIG. 4 shows the configuration-defining tables. Two configuration-defining tables are used: one is a path-configuration-defining table 600 which describes the path settings; and the other is a security-configuration-defining table 601 which describes security settings. The path-configuration-defining table 600 and the security-configuration-defining table 601 both consist of electronic data, which can be edited and stored with spreadsheet software or the like.

The format for the path-configuration-defining table 600 is prescribed so that the volumes and the FC ports can be written-in as configuration-defining parameters. The examples in FIG. 4 indicate that an attempt is being made to define the correlation between volume 3 and FC port B and the correlation between volume 6 and FC port D.

The format for the security-configuration-defining table 601 is prescribed so that the WWNs of the FC ports 102 on the disk-array device 100 and FC ports 301 on the computers 300 can be written-in as configuration-defining parameters. The examples in FIG. 4 indicate that an attempt is being made to correlate FC port 2 (four lowest WWN digits=5004) on a computer 300 with FC port B on the disk-array device 100, and to correlate FC port 3 (four lowest WWN digits=7002) with FC port D.

Figure 5:
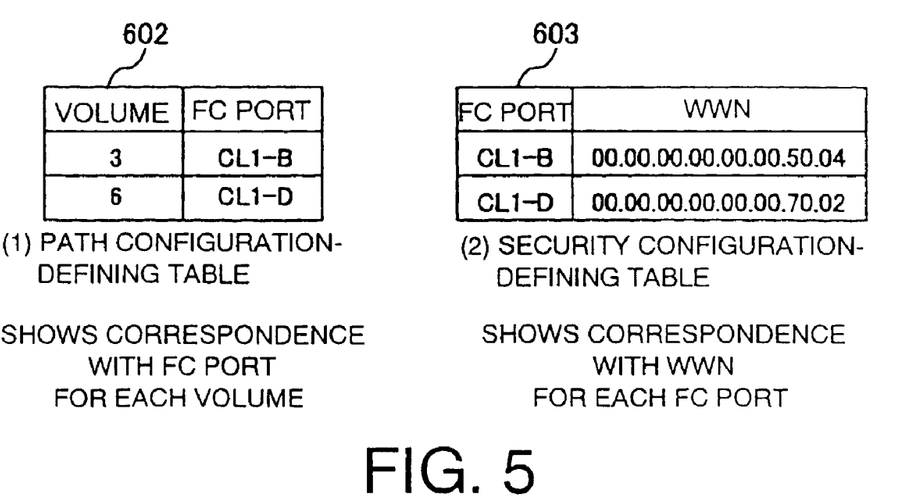
FIG. 5 shows configuration-defining tables that define the path and security configurations for disk-array device setup according to another embodiment of the present invention.

FIG. 5 shows configuration-defining tables that carry the same contents as the tables shown in FIG. 4. However, the tables in these two figures slightly differ in the way of designating the FC ports and the way of designating the WWNs. Although the FC ports and WWNs represent the same items, there are cases where the display method may slightly vary, for instance, with the model of the disk-array device. Therefore, the configuration-defining tables are to be constructed so as to flexibly accept various description entries.

By putting (or loading) the disk-array device settings in electronic-data form in the configuration-defining tables in advance as described above, it becomes possible to reuse the previously created configuration-defining tables for disk-array device setup purposes. This eliminates the necessity for manually entering one setup command after another as in the past, thereby the labor required for setup being substantially reduced. Further, since the contents of the configuration-defining tables can be modified with ease, any errors can be corrected immediately.

Next, the current configuration information 104 about the disk-array device 100 is acquired (S31). For information acquisition, the management program 202 makes a request to the disk-array device 100 for the configuration information 104. Upon receiving the request for the configuration information 104, the disk-array device 100 transmits the configuration information 104 to the information processing device 200 via the LAN 500.

Figure 6:
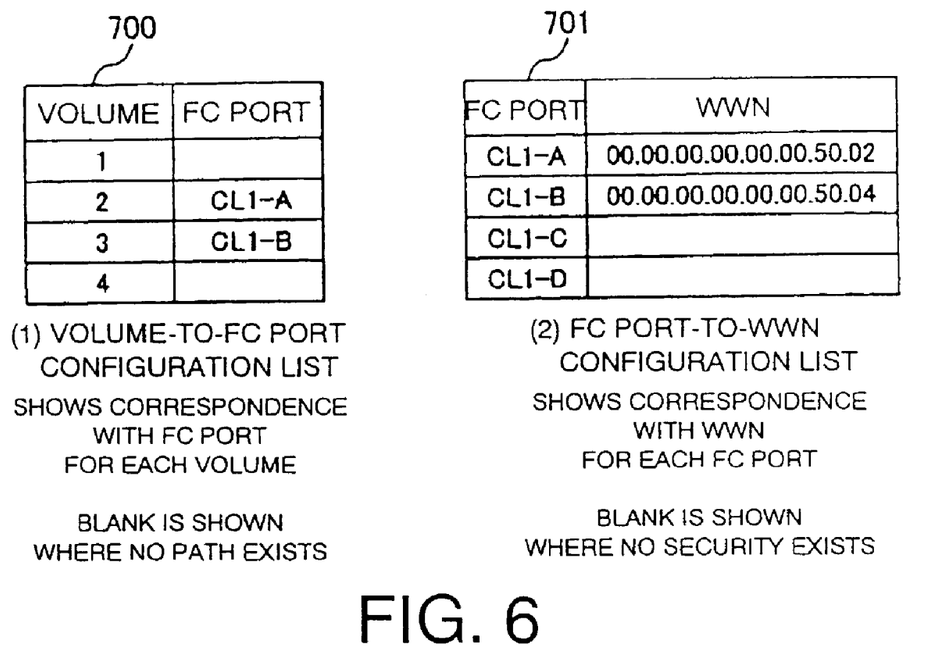
FIG. 6 shows configuration lists that indicate the current path and security configurations for disk-array device setup according to an embodiment of the present invention.

The management program 202 creates configuration lists shown in FIG. 6 in accordance with the configuration information 104. The current settings for the disk-array device 100 are written in the configuration lists. Two configuration lists are used: one is a volume-to-FC-port configuration list 700, which describes the path settings; and the other is an FC-port-to-WWN configuration list 701, which describes security settings. The volume-to-FC-port configuration list 700 and FC-port-to-WWN configuration list 701 both consist of electronic data, which can be edited and stored with spreadsheet software or the like. Therefore, if configuration lists 700, 701 were created in the past by acquiring the configuration information 104 from the disk-array device 100 and have been stored in the information processing device 200, the stored configuration lists 700, 701 can be reused. In another example, a maintenance engineer may create the configuration lists by inputting the settings for the disk-array device 100 from the information processing device 200.

The format for the volume-to-FC-port configuration list 700 is prescribed so that a volume and an FC port are recorded as a pair. The examples in FIG. 6 indicate that volume 2 is correlated with FC port A and that volume 3 is correlated with FC port B.

The format for the FC-port-to-WWN configuration list 701 is prescribed so that an FC port 102 on the disk-array device 100 and a WWN of an FC port 301 on a computer 300 is recorded as a pair. The examples in FIG. 6 indicate that FC port A on the disk-array device 100 is correlated with FC port 1 (four lowest WWN digits=5002) on a computer 300, and that FC port B is correlated with FC port 2 (four lowest WWN digits=5004).

Next, the management program 202 verifies whether there are any errors in the configuration-defining tables (S32). This verification is performed by comparing the configuration-defining tables against the configuration lists. The verification procedure will be explained in detail with reference to FIG. 7.

Figure 7:
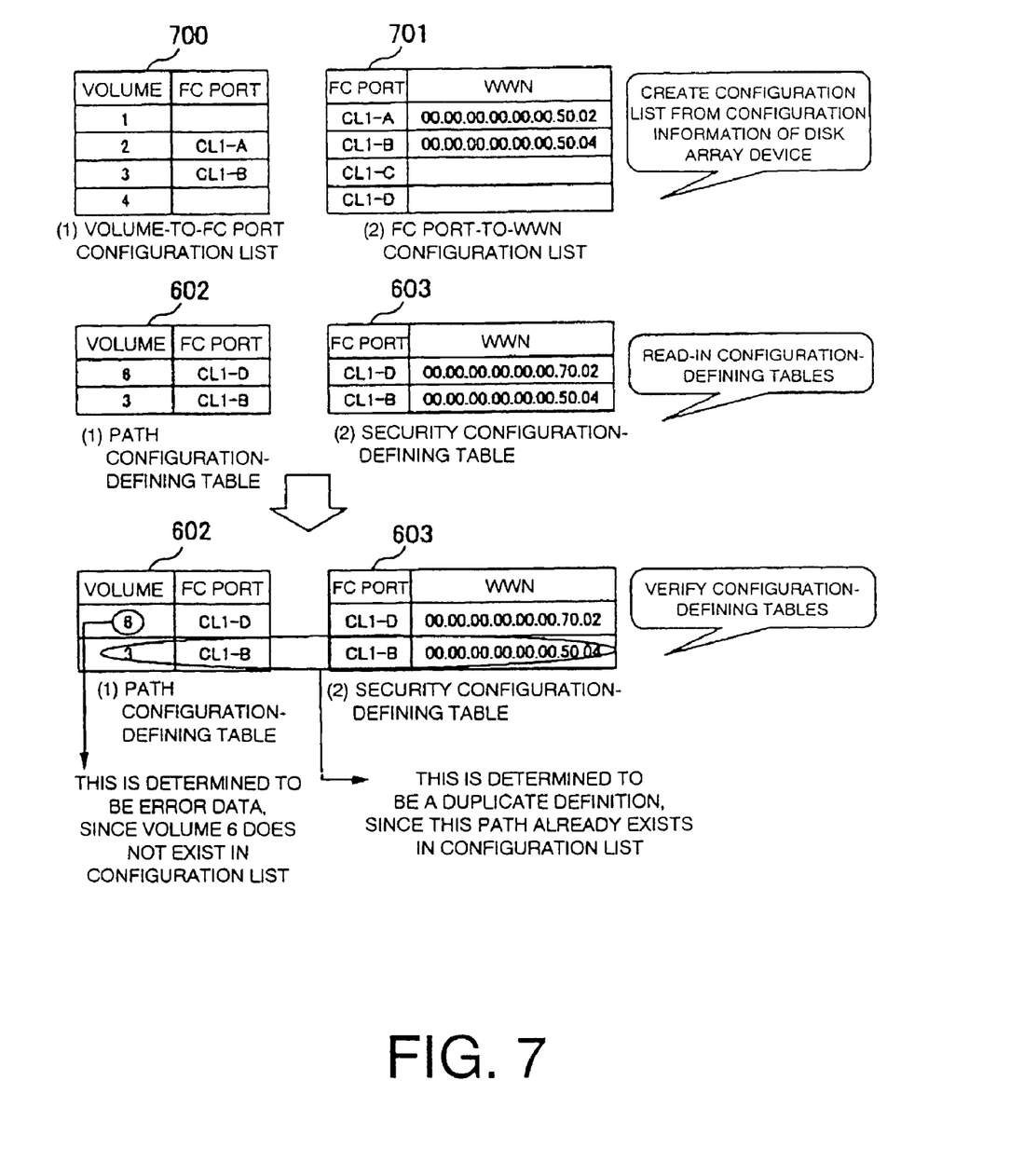
FIG. 7 shows the verification of configuration-defining tables according to an embodiment of the present invention.

First of all, the management program 202 analyzes the volume-to-FC-port configuration list 700 and acquires the following information of path settings about the disk-array device 100:

(1) There are four volumes, which are specified by 1 through 4.
(2) FC port A is correlated with volume 2.
(3) FC port B is correlated with volume 3.

(4) No FC port is correlated with volume 1 or 4.

Next, the management program 202 acquires the following information of security settings about the disk-array device 100 from the FC-port-to-WWN configuration list 701:

(5) There are four FC ports, which are specified by A through D.

(6) FC port 1 (four lowest WWN digits=5002) is correlated with FC port A.

(7) FC port 2 (four lowest WWN digits=5004) is correlated with FC port B.

(8) No security setup has been performed for FC port C or D.

Next, the management program 202 acquires the following items of information from the path-configuration-defining table 602:

(9) An attempt is being made to correlate FC port D with volume 6.

(10) An attempt is being made to correlate FC port B with volume 3.

Next, the management program 202 acquires the following items of information from the security-configuration-defining table 603:

(11) An attempt is being made to correlate FC port 3 (four lowest WWN digits=7002) with FC port D.

(12) An attempt is being made to correlate FC port 2 (four lowest WWN digits=5004) with FC port B.

In accordance with the above information, the management program 202 verifies the configuration-defining tables. The management program 202 first verifies the path-configuration-defining table 602. When the management program 202 compares information (9) against information (1), information (2), information (3), and information (4), it finds that information (9) does not comply with the conditions stipulated by information (1). The management program 202 then finds that information (9) is in error. In this instance, "volume 1", "volume 2", "volume 3", or "volume 4" can be provided as a correction candidate for "volume 6" that is described within information (9). This correction candidate is displayed when an attempt is made later to correct the configuration-defining tables. In this manner, the labor required for configuration-defining table correction can be reduced.

Next, information (10) is compared against information (1), information (2), information (3), and information (4). Then, information (10) turns out to be the same as information (3), and, the management program 202 finds that information (10) may be a duplicate definition. Determination of whether information (10) is really a duplicate definition will be made along with the verification result for the security-configuration-defining table 603.

Next, the management program 202 verifies whether there are any errors in the security-configuration-defining table 603. When compared with information (5), information (6), information (7), and information (8), information (11) is found to be correct.

Then, when compared with information (5), information (6), information (7), and information (8), information (12) turns out to be the same as information (7). The management program 202 can find that information (12) may be a duplicate definition. By referring to the verification result for the path-configuration-defining table 602, it is found that information (12) is actually a duplicate definition because information (10) and information (12) both relate to FC port B. In this instance, the management program 202 can provide either "volume 1", "volume 2", or "volume 4" as a correction candidate for "volume 3" that is described within information (10). The management program 202 can also provide either "FC port A", "FC port C", or "FC port D" as a correction candidate for "FC port B" that is described within information (10). However, if "volume 2" is selected as a correction, "FC port A" will be omitted from the correction candidates. As regards "FC port 2", which is described within information (12), no correction candidate will be provided because it is not possible to specify the WWNs of the FC ports 301 on the computers 300 connected to the disk-array device 100 via the SAN 400.

Through the above verification process, the management program 202 was able to find two errors in the configuration-defining tables 602, 603. One error is that a nonexistent volume is designated (information (9)). The other error is that a duplicate definition is formulated (information (10) and information (12)).

The management program 202 visually displays the result of the above verification (S33), making it easy for a user to comprehend where and how the settings are erroneous.

The verification result is displayed on the output device 208 (which may function as the "means for displaying") that the information processing device 200 comprises. Further, it is also possible to display the verification result on displaying means provided to another equipment, which is connected to the information processing device 200 via the LAN 500, by transmitting the verification result through the port 201 towards the other equipment.

Figure 8:
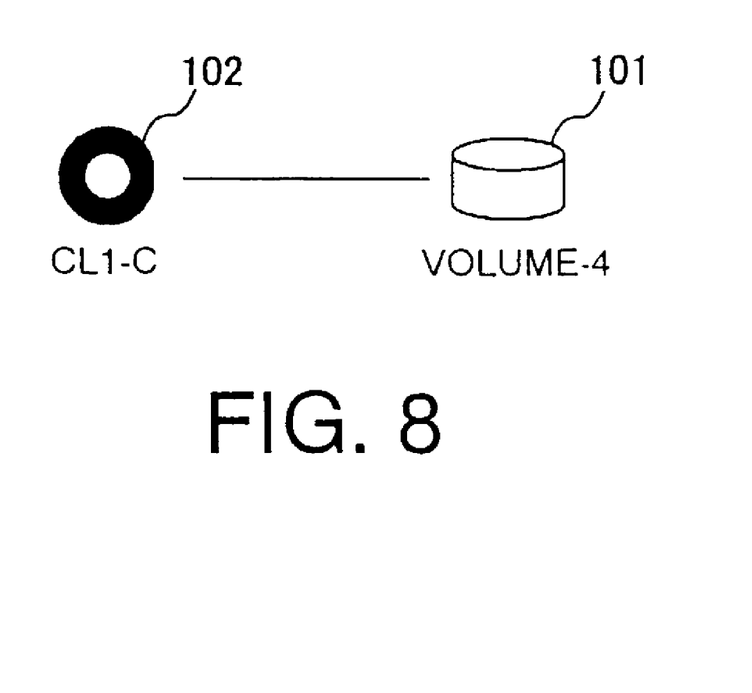
FIG. 8 shows a path in a disk-array device according to an embodiment of the present invention.
Figure 9:
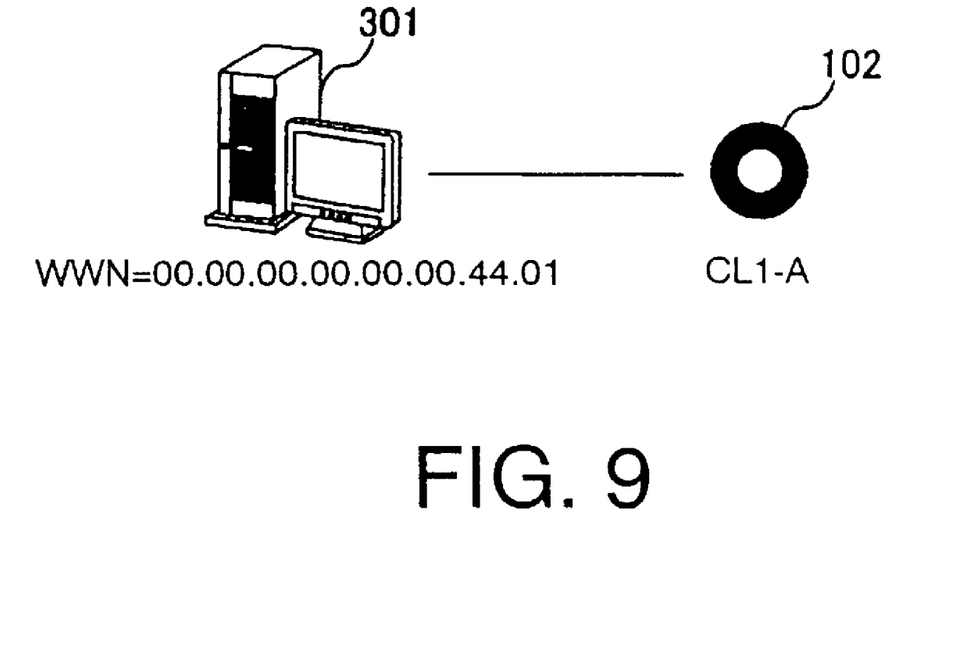
FIG. 9 shows security for a disk-array device according to an embodiment of the present invention.

FIG. 8 and FIG. 9 indicate how the paths and security are expressed when the verification result is displayed. FIG. 8 shows how the paths are depicted. It indicates the relationship between an FC port 102 and volume 101. FIG. 9 depicts the security information. It indicates the relationship between an FC port 102 and an FC port 301.

Figure 10:
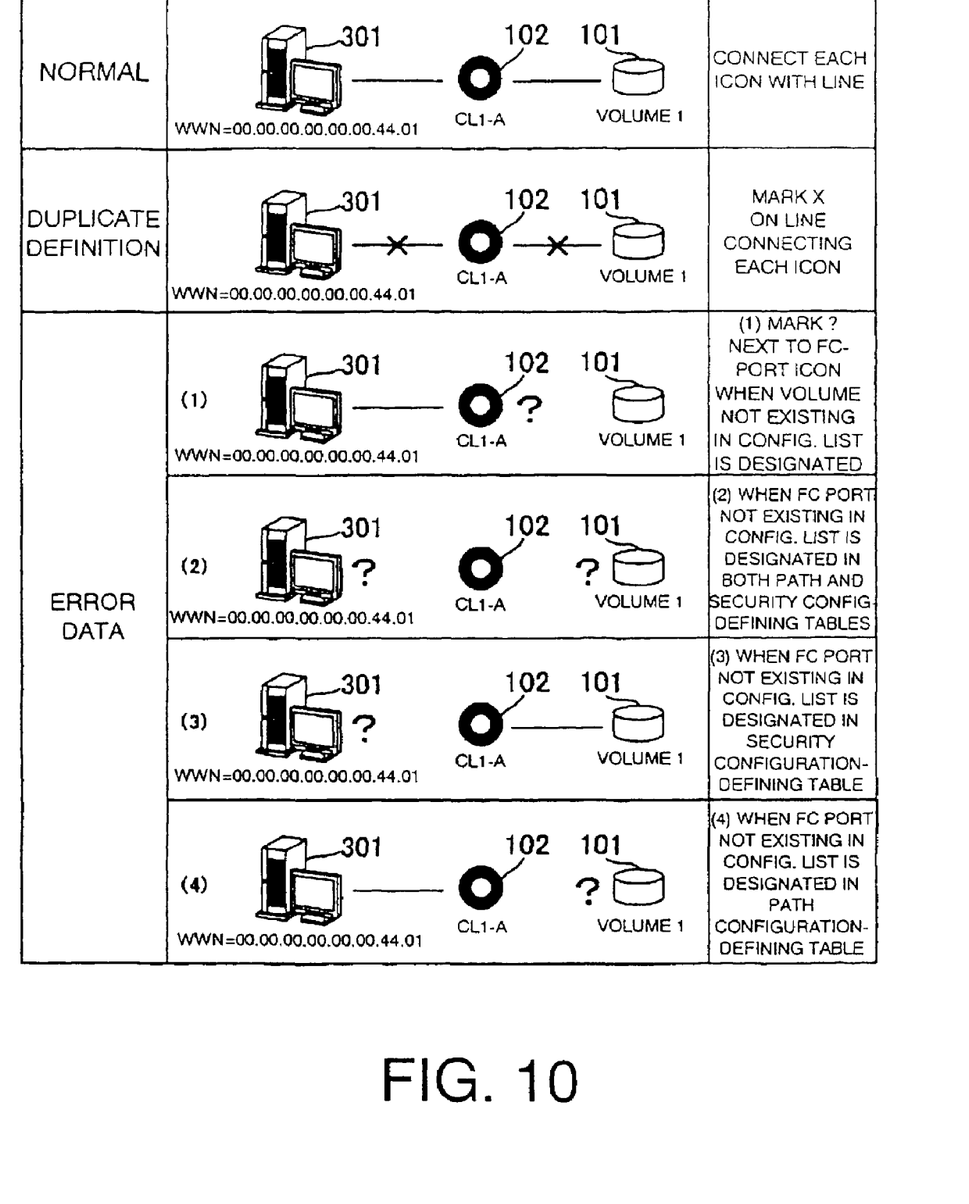
FIG. 10 presents examples that indicate how the verification results of configuration-defining tables are illustrated according to an embodiment of the present invention.

FIG. 10 illustrates how the errors found in the verification process are depicted and what indication is given when no error is found.

When no error is found in the verification process, the associated icons are joined with a line. The illustrated example in the figure shows that the relationship among a volume 101, an FC port 102, and an FC port 301 on a computer is established. A duplicate definition is indicated by displaying an "X" mark on the line joining the associated icons.

If a volume 101 is not found in the configuration-defining tables although it is designated, a "?" mark will appear next to the icon of the corresponding FC port 102. This indicates a situation where there is no volume 101 that can make a pair with the FC port 102.

If an FC port 102 that does not exist in the configuration lists is designated in both the path-configuration-defining table and security-configuration-defining table, the "?" marks will appear next to the icon of the corresponding volume 101 and next to the corresponding FC port 301 on a computer 300. This indicates that there is no FC port 102 that can make a pair with the volume 101 or the FC port 301 on the computer 300.

If an FC port 102 that does not exist in the configuration lists is designated in the security-configuration-defining table, the "?" mark will appear next to the corresponding FC port 301 on a computer 300. This indicates that there is no FC port 102 that can make a pair with the FC port 301 on the computer 300.

If an FC port 102 missing from the configuration lists is designated in the path-configuration-defining table, the "?" mark will appear next to the corresponding volume 101. This indicates that there is no FC port 102 that can make a pair with the volume 101. In addition to the indications described in the above examples, various other styles of expression may be employed.

Figure 11:
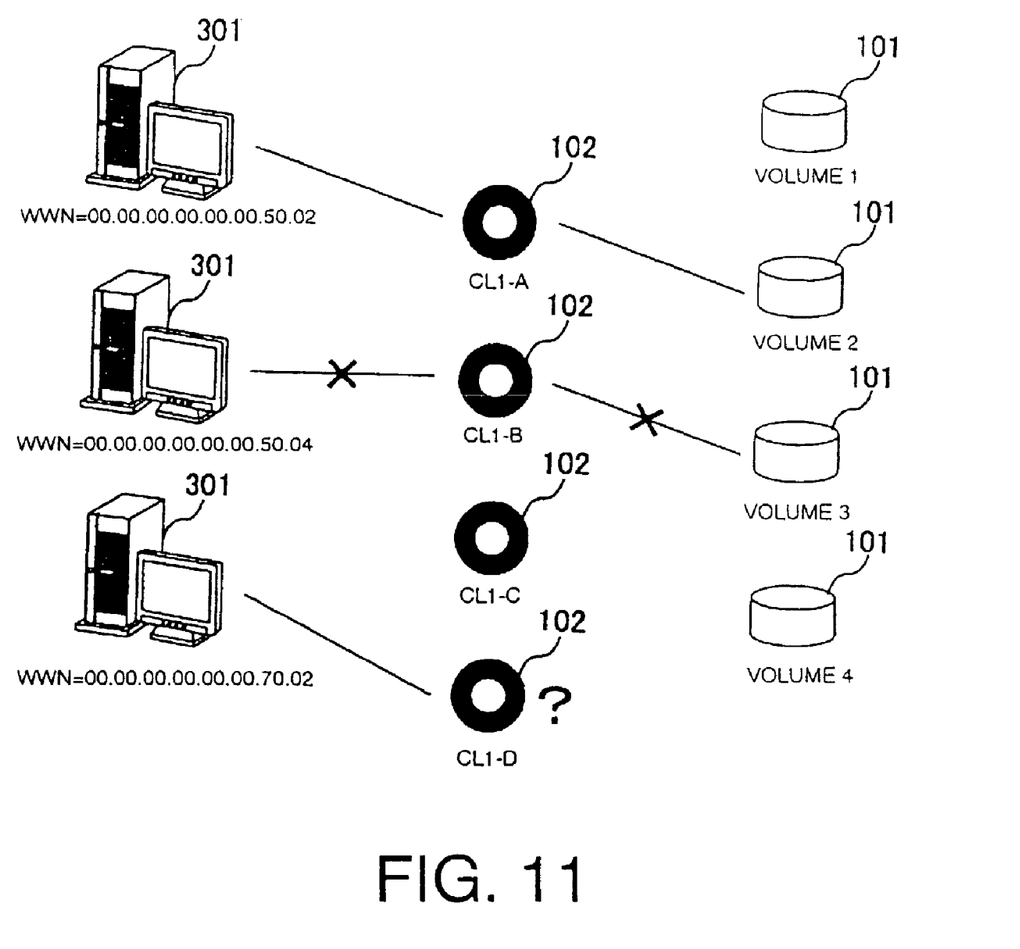
FIG. 11 shows the verification results of configuration-defining tables according to an embodiment of the present invention.

In compliance with the above expression rules, FIG. 11 illustrates the result of a verification that was made with reference to FIG. 7.

Graphically displaying the result of verification as shown in FIG. 11 makes it possible to quickly and easily comprehend where and how the settings are erroneous. More specifically, it is possible to understand that the path and security settings for FC port A are both in correct state, that the FC port B has been defined twice, and further that an incorrect volume has been designated for the path setup of FC port D.

Since the result of the above verification indicates that the configuration-defining tables are in error, the setup process ends here (S34) according to the present embodiment. The maintenance engineer who sets the disk-array device 100 corrects any error in the configuration-defining tables, again makes the management program 202 load the corrected configuration-defining tables (S30), and performs setup.

The configuration-defining tables are to be corrected as explained below. Corrections are to be made by directly rewriting the data written in the path-configuration-defining table 602 and security-configuration-defining table 603. The verification result shown in FIG. 11 makes it possible to readily determine what data in the configuration-defining tables need to be rewritten. In addition, the relevant sections in the configuration-defining tables are marked so as to facilitate identification. The relevant sections are highlighted by, for instance, surrounding the erroneous entries in the configuration-defining tables with a thick line, by changing the color of the surrounding line, or by coloring the relevant cells. To furnish the maintenance engineer with useful information about how to rewrite the relevant erroneous data, the management program 202 displays correction candidates for such erroneous data on the output device 208 (which may function as "means for displaying a candidate"). The correction candidates can be displayed, for instance, by opening a pop-up window, which lists correction candidates, when the mouse cursor is positioned over an erroneous cell, or by displaying a list of correction candidates when an erroneous cell is clicked with the mouse cursor positioned over it.

Figure 12:
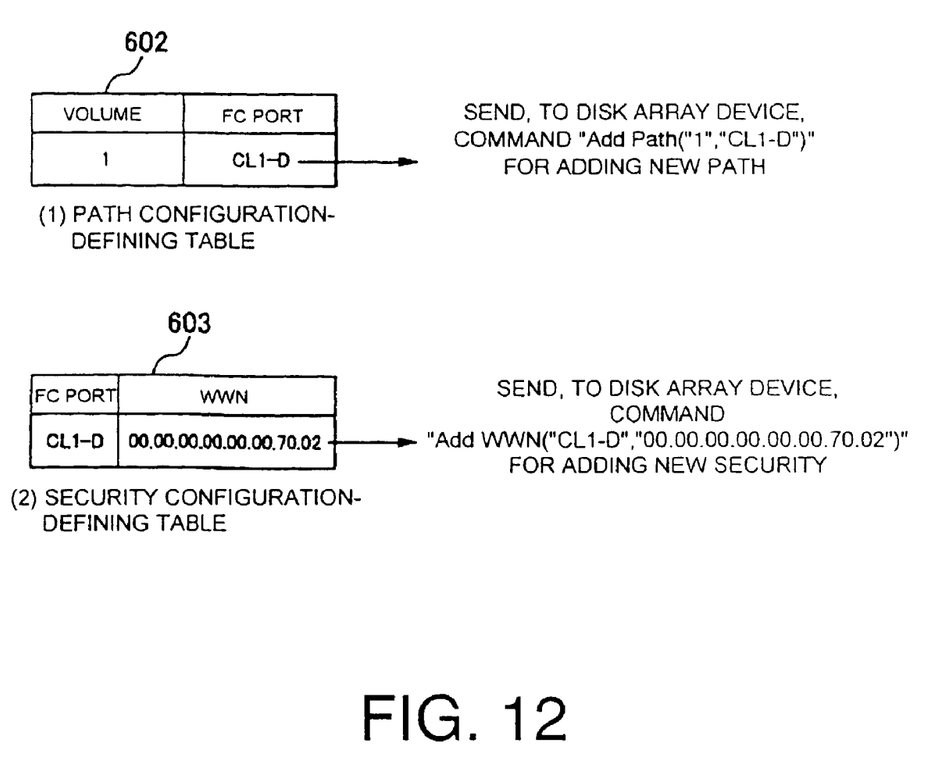
FIG. 12 shows corrected configuration-defining tables and setup commands according to an embodiment of the present invention.

FIG. 12 shows the configuration-defining tables that are corrected as explained above. These configuration-defining tables contain no error. Therefore, when a series of setup processing steps is performed (S30 through S34), the management program 202 requests the disk-array device 100 to change the configuration information (S35).

More specifically, the maintenance program 202 generates command "AddPath ("1", "CL1-D")" and command "AddWWN ("CL1-D", "00.00.00.00.00.00.70.02")" as the path and security setup commands in accordance with the path-configuration-defining table 602 and security-configuration-defining table 603, and transmits them together to the disk-array device 100. Transmitting to the disk-array device 100 is made from the port 201 (which may function as "means for transmitting a setup command") of the information processing device 200 via the LAN 500.

Upon receipt of the above setup commands, the disk-array device 100 updates the internally stored configuration information 104. Path and security setup is completed accordingly.

According to the presently preferred embodiment, by putting (or loading) disk-array device settings in the configuration-defining tables in electronic-data form in advance, it becomes possible to edit the settings with ease and reuse the configuration-defining tables. Therefore, the labor required for disk-array device setup can be reduced when compared to the use of a conventional method which requires manual entering of settings every time a disk-array device is set up.

The use of a conventional method makes it mandatory to generate setup commands, one by one, with a management program and transmit them to the disk-array device. Therefore, if an error is found after the setup process is half-completed, the already-completed setup steps might be wasted. However, the present embodiment makes it possible to avoid wasting of setup steps because the setup commands can be verified by the management program prior to their transmission to the disk-array device.

Further, in the present embodiment, the verification result of the settings is graphically displayed. Accordingly, a maintenance engineer can readily check for errors and identify their causes. As a result, it is possible to reduce the burden relating to correction of erroneous settings.

Furthermore, erroneous settings are not only graphically displayed but also marked within the configuration-defining tables. This makes it possible to instantly locate the settings that need to be corrected. Since correction candidates are also indicated when such erroneous settings are visually pointed out, errors can be corrected with ease.

While the present invention has been described in terms of preferred embodiments, it should be understood that the invention is not limited to those preferred embodiments, and that variations may be made without departure from the scope and spirit of the invention.

The present invention makes it possible to reduce the labor required for disk-array device setup.

What is claimed is:

1. A method for setting up a disk-array device, said disk-array device comprising at least one connection port for connection with at least one computer, and at least one storage volume for storing data, said method comprising the steps of:
    (a) loading configuration-defining data to an information processing device that is connected to said disk-array device, said configuration-defining data being in an electronic-data form;
    (b) said information processing device
        generating, in accordance with said configuration-defining data, a setup command for setup of said disk-array device and
        transmitting said setup command to said disk-array device; and
    (c) said disk-array device
        receiving said setup command and
        performing said setup according to said setup command.

2. A method for setting up a disk-array device according to claim 1, wherein said configuration-defining data contains at least one configuration-defining parameter of said disk-array device in a prescribed format, said method further comprising the step of:
    before said step of generating said setup command and transmitting said setup command to said disk-array device, said information processing device verifying whether said configuration-defining parameter is applicable to the configuration of said disk-array device and displaying said configuration-defining parameter that has been determined to be inapplicable to said configuration.

3. A method for setting up a disk-array device according to claim 2, wherein said displaying of said configuration-defining parameter is done graphically.

4. A method for setting up a disk-array device according to claim 3, wherein said configuration-defining parameter defines a correlation between said connection port and said storage volume.

5. A method for setting up a disk-array device according to claim 3, wherein said configuration-defining parameter defines a correlation between said connection port and a port on said computer.

6. A method for setting up a disk-array device according to claim 1, wherein said configuration-defining data contains at least one configuration-defining parameter of said disk-array device in a prescribed format, said method further comprising the step of:

before said step of generating said setup command and transmitting said setup command to said disk-array device, said information processing device verifying whether said configuration-defining parameter is applicable to the configuration of said disk-array device and displaying at least one candidate which is applicable to said configuration for said configuration-defining parameter that has been determined to be inapplicable to said configuration.

7. A computer-readable storage medium including a program to be executed by an information processing device connected to a disk-array device, said disk-array device comprising at least one connection port for connection with at least one computer, and at least one storage volume for storing data, said storage medium comprising:

code for loading configuration-defining data in an electronic-data form; and code for generating, in accordance with said configuration-defining data, a setup command for setup of said disk-array device and transmitting said setup command to said disk-array device.

8. A storage medium according to claim 7, wherein said configuration-defining data contains at least one configuration-defining parameter of said disk-array device in a prescribed format, said storage medium further comprising:

code for verifying whether said configuration-defining parameter is applicable to the configuration of said disk-array device and displaying said configuration-defining parameter that has been determined to be inapplicable to said configuration, before generating said setup command and transmitting said setup command to said disk-array device.

9. A storage medium according to claim 8, wherein said displaying of said configuration-defining parameter is done graphically.

10. A storage medium according to claim 9, wherein said configuration-defining parameter defines a correlation between said connection port and said storage volume.

11. A storage medium according to claim 9, wherein said configuration-defining parameter defines a correlation between said connection port and a port on said computer.

12. A storage medium according to claim 7, wherein said configuration-defining data contains at least one configuration-defining parameter of said disk-array device in a prescribed format, said storage medium further comprising:

code for verifying whether said configuration-defining parameter is applicable to the configuration of said disk-array device and displaying at least one candidate which is applicable to said configuration for said configuration-defining parameter that has been determined to be inapplicable to said configuration, before generating said setup command and transmitting said setup command to said disk-array device.

13. An information processing device capable of being connected to a disk-array device, said disk-array device comprising at least one connection port for connection with at least one computer, and at least one storage volume for storing data, said information processing device comprising:

means for loading configuration-defining data in an electronic-data form; and means for generating, in accordance with said configuration-defining data, a setup command for setup of said disk-array device and transmitting said setup command to said disk-array device.

14. An information processing device according to claim 13, wherein said configuration-defining data contains at least one configuration-defining parameter of said disk-array device in a prescribed format, said information processing device further comprising means for verifying whether said configuration-defining parameter is applicable to the configuration of said disk-array device and displaying said configuration-defining parameter that has been determined to be inapplicable to said configuration, before generating said setup command and transmitting said setup command to said disk-array device.

15. An information processing device according to claim 14, wherein said displaying of said configuration-defining parameter is done graphically.

16. An information processing device according to claim 15, wherein said configuration-defining parameter defines a correlation between said connection port and said storage volume.

17. An information processing device according to claim 15, wherein said configuration-defining parameter defines a correlation between said connection port and a port on said computer.

18. An information processing device according to claim 13, wherein said configuration-defining data contains at least one configuration-defining parameter of said disk-array device in a prescribed format, said information processing device further comprising means for verifying whether said configuration-defining parameter is applicable to the configuration of said disk-array device and displaying at least one candidate which is applicable to said configuration for said configuration-defining parameter that has been determined to be inapplicable to said configuration, before generating said setup command and transmitting said setup command to said disk-array device.

* * * * *